United States Patent Office 3,623,232
Patented Nov. 30, 1971

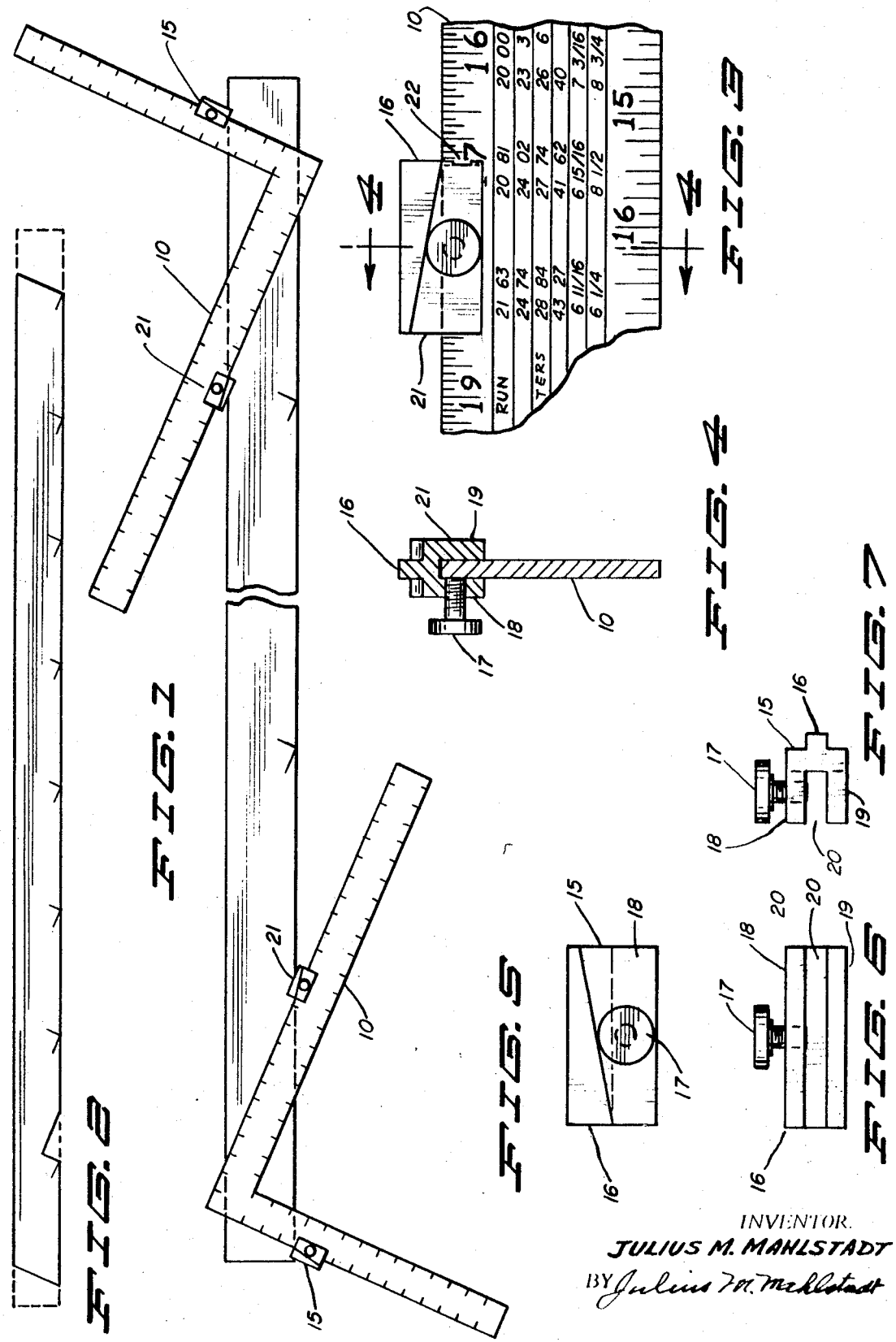

3,623,232
CHECK MARK RAFTER AND STAIR LAYOUT GAUGES
Julius M. Mahlstadt, Brown County, Minn.
(1211 N. Spring St., New Ulm, Minn. 56073)
Filed Jan. 26, 1970, Ser. No. 889,009
Int. Cl. B43l 7/00
U.S. Cl. 33—173  1 Claim

ABSTRACT OF THE DISCLOSURE

A pair of scribing accessories adjustably attachable to a carpenter's framing square for scribing of rafter layouts. Each accessory is substantially U-shaped for straddling the arms of the square, has locking means thereon, a fin and inclined shoulders.

---

This invention relates to new and useful improvements in carpenter's scribing apparatus and more particularly to scribing accessories adjustably attachable to a carpenter's framing square for quicker, easier and more accurate scribing of rafter layouts for sawing and stair stringer scribing and other angles used in carpentry.

It is an object of the present invention to provide more accurate scribing devices that enables the scriber to make matching check marks that coincide with each other as the square is advanced step by step in the usual step off method of measuring lengths of the various types of rafters and also for more accurate marking of tail cut, plate cut and plumb cut at the ridge and side cuts of the hip, valley, jack and cripple rafters.

Another object of the present invention is to provide for more accurate scribing devices, each designed with a fin that projects outwardly from the grooved portion of the gauge that straddles the outer edge of the carpenter's framing square, which thereby enables the scriber to form or make matching check marks, using the outer edge of the square for one leg of the check mark and the said fin projecting outwardly from the outer edge of the carpenter's square to form or scribe the other leg of the right angle check mark. (Or any other angle check marks greater or lesser than 90 degrees if said check mark gauges are so designed by altering the angle of the fin in relation to the outer edge of the carpenter's framing square.)

Still another object of the present invention is to provide one of a pair of gauges with an approximately .03 of an inch recess in the figure aligning end of the grooved portion of the gauge; said .03 of an inch recess to be aligned with the 17 inch mark on the body of the carpenter's framing square so as to position the scribing end of the fin to rest at the 16.97 inch position on the body of the carpenter's framing square thereby enabling the carpenter to scribe 16.97 inch steps instead of the usual 17 inch steps when stepping off hip rafter lengths and more accurately marking plumb and level cuts. In the older way of stepping off a hip rafter for a building 34 feet wide, it would require 17 steps and at .03 of an inch error in each step would be 17×.03 or .51 of an inch in accumulated errors in the run of the hip rafter which would make the length of the rafter still more in error.

Another object of the present invention is to enable the scriber to accurately mark angles and accurately measure lengths of rafters by the step off method on dimensional lumber that has the edges chamfered off which makes it virtually impossible to see or determine where the step off marks intersect at the chamfered off edges when using the older conventional step off gauges, or when using no gauges at all.

A still further object of the present invention is to provide check mark rafter and stair layout gauges which can be produced, packaged and sold in large quantities at a comparatively low cost and can be conveniently utilized where ever needed.

Still additional objects, benefits and advantages of this invention will become evident from a study of the following detailed description taken in conjunction with the accompanying drawing in which:

FIG. 1 is a view of a common rafter in the process of being marked for saw cuts at the overhang at the eaves, marked for plate cuts and stepped off for length and marked for plumb cut at the ridge by the use of check mark gauge 15 attached to the tongue of the carpenter's framing square for the rise and check mark gauge 21 shown in FIG. 3 attached to the body of the carpenter's framing square for the run of the rafter.

FIG. 2 is a view of a rafter that has been plumb cut at the eaves, plumb and level cut at the bird's mouth for the plate, stepped off for length and plumb cut for length at the ridge.

FIG. 3 is a side view of a check mark gauge attached to the body of a carpenter's framing square showing a recess of approximately .03 of an inch in the figure aligning ends of the clamping portion of the check mark gauge which when the recess is set at the center of the 17 inch mark on the body of the square will place the scribing end of the fin to a shorter hip rafter run step of 16.97 inches instead of the erroneous full 17 inch step used for stepping off hip rafter runs in the past. Note: This recess on the marking end of the clamping portion of the check mark gauge is used only when stepping off hip rafters.

FIG. 4 is a sectional end view along line 4 of the side view of FIG. 3 showing the recessed gauge 21 attached to the carpenter's framing square 10 between side member 19 and thumb screw 17 threaded in side member 18.

FIG. 5 is a side view of the check mark gauge 15 showing the rafter rise per step figure alignment and marking end of the fin 16 which projects outwardly from the outer edge of the tongue of the carpenter's framing square and held in the pre-selected position by the clamping action of the thumb screw 17, threaded into side member 18 of the channeled portion 20 of the gauge shown in FIG. 6 which, in conjunction with the opposite side member 19 of the channeled portion forms a clamp.

FIG. 6 is a bottom view of the check mark gauge 15 showing the channel 20 with side member 18 drilled and threaded to receive threaded thumb screw 17 to hold the check mark gauge secure to the pre-determined position on the outer edge of the carpenter's framing square by the clamping action between the threaded thumb screw and the opposite channel side member 19.

FIG. 7 is an end view of the check mark gauge opposite the aligning and scribing end showing projecting fin 16 opposite but aligned with the grooved or channeled portion 20 of the gauge which straddles the carpenter's framing square between the clamping member 19 and clamping thumb screw 17 threaded into channel side member 18.

While this invention has been described with particular reference to the construction shown in the drawing and while various changes may be made in the detail construction, it shall be understood that such changes shall be within the spirit and scope of the present invention as defined by the appended claim.

Having thus completely and fully described the invention what is now claimed as new and desired to be protected by Letters Patent of the United States is:

1. In combination with a carpenter's framing square, a set of two identical gauges adapted to be mounted on the arms of the carpenter's square, each gauge comprising a pair of identical, parallel, spaced apart leg members having coplanar short end, long end, bottom and top surfaces with said top surfaces being inclined and interconnecting said short and long end surfaces, a fin member having parallel top and bottom surfaces and parallel end and side surfaces, said fin member interconnecting the adjacent side surfaces of said leg members adjacent said inclined top surfaces and connected so that said end surfaces of said leg members and end surfaces of said fin member are coplanar, said side surfaces of said fin member are coplanar with the adjacent side surfaces of said leg members, the intersection of said end and bottom surfaces of said fin member are co-linear with the intersection of the inclined top and short end surfaces of the leg members and said top and bottom surfaces of said fin member are parallel to said bottom surfaces of said leg members, said leg and fin members forming an open ended channel for receiving an arm of the carpenter's square, one leg of said gauge having a thumb screw threaded therethrough and extending into said channel for securing the gauge to the arm, said short end surfaces of the leg members having open ended flat bottomed U-shaped recesses formed therein over a major portion of the surfaces and extending to a depth of .03 inch, the bottom of said recesses forming a measuring surface inwardly of the end surfaces.

References Cited

UNITED STATES PATENTS

| | | | |
|---|---|---|---|
| 124,887 | 3/1872 | Dalgiesh | 33—173 |
| 183,387 | 10/1876 | Essex | 33—112 |
| 854,125 | 5/1907 | Thompson | 33—173 |
| 2,805,484 | 9/1957 | D'Aoust | 33—173 |

HARRY N. HAROIAN, Primary Examiner

U.S. Cl. X.R.

33—112